United States Patent [19]

Gerlinger

[11] 4,175,369
[45] Nov. 27, 1979

[54] HAYMAKING MACHINE WITH LATERAL DISCHARGE WINDROWING AND CENTRAL TEDDING

[75] Inventor: Frédéric Gerlinger, Ottersthal, France

[73] Assignee: Kuhn S.A., Saverne, France

[21] Appl. No.: 848,593

[22] Filed: Nov. 4, 1977

[30] Foreign Application Priority Data

Nov. 5, 1976 [FR] France ............................... 76 34063

[51] Int. Cl.² ............................................. A01D 79/00
[52] U.S. Cl. ..................................................... 56/370
[58] Field of Search ........................ 56/370, 365, 368

[56] References Cited

U.S. PATENT DOCUMENTS 4,015,413  4/1977  van der Plas et al. ................. 56/370

FOREIGN PATENT DOCUMENTS 1482908 11/1969 Fed. Rep. of Germany ............. 56/370
2310081 12/1976 France ....................................... 56/370
1126908  9/1969 United Kingdom ....................... 56/370

*Primary Examiner*—Jay N. Eskovitz
*Attorney, Agent, or Firm*—Young & Thompson

[57] ABSTRACT

A haymaking machine for carrying out lateral discharge windrowing or central tedding, comprises a pair of rotary rake heads interconnected by a chassis. A control member causes the chassis to rotate about an axis parallel to the axis of the chassis. An intermediate element is articulated to the chassis about this axis and a beam extends between the chassis and a hitch device. The beam is articulated to the intermediate element about a vertical axis and is connected to the chassis.

5 Claims, 6 Drawing Figures

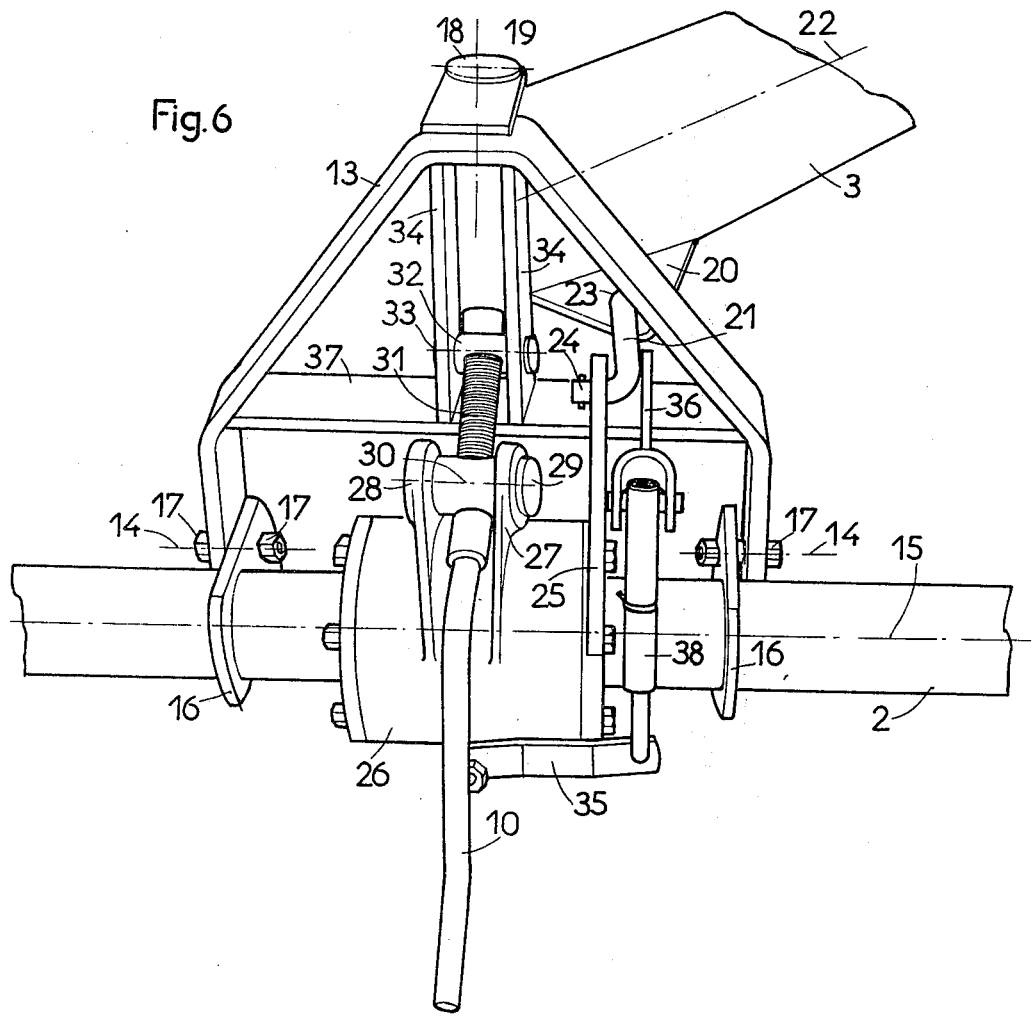

HAYMAKING MACHINE WITH LATERAL DISCHARGE WINDROWING AND CENTRAL TEDDING

The present invention relates to combined haymaking machines permitting especially of carrying out lateral discharge windrowing work and central tedding work.

According to the invention it is possible to cause machines of this kind to pass very quickly and easily from their windrowing position into their tedding position and vice versa. The transformation of the majority of combined haymaking machines from their windrowing position into their tedding position and vice versa necessitates a certain number of operations which are generally lengthy and tedious to carry out. Thus for example to pass a haymaking machine from its tedding position into its windrowing position, the rotary rake heads must be raised so that their respective axes of rotation are substantially perpendicular to the ground, then the position and/or control of the tools of the rotary rake heads must be modified. If the above-described haymaking machine is to carry out lateral windrowing work, it is further necessary to modify the orientation of its chassis, to change the direction of rotation of one of the rotary rake heads of the machine, if it comprises two of them, and to orient its land wheels suitably. In order to pass the machine from its windrowing position into its tedding position, it is of course necessary to proceed in the converse manner.

Thus the drawback of this kind of machine consists in the large number of operations to be carried out in order to pass the machine from one of its working positions into the other position, and in the fact that the omission of one of these operations prevents the machine from operating correctly and is in danger of causing significant damage to the machine.

Consequently the present invention has for object a device combining at least two of the above stated operations in such manner that if one of these is carried out, a second and even a third operation are executed simultaneously and automatically.

According to a first characteristic of the present invention, means are provided which automatically and simultaneously cause the rotation of the chassis of the machine about a substantially vertical axis when the inclination of the axes of rotation of the rotary rake heads of the said machine is modified. Thus if it is desired to pass the machine from its tedding position into its position for lateral discharge windrowing, the fact of operating the said means raises the axes of rotation of the rotary rake heads of the machine so that they are substantially perpendicular to the ground, while pivoting the chassis of the machine which interconnects the said rotary rake heads, about a substantially vertical axis in such manner that the said chassis forms an angle substantially different from 90° with the direction of travel of the machine. If the said means are actuated in the converse manner, the converse result is obtained, that is the inclination of the axes of rotation of the rotary rake heads forward—seen in the direction of travel of the machine—will cause a rotation of the chassis of the machine about a substantially vertical axis, this rotation taking place until the said chassis extends substantially perpendicularly to the direction of travel of the machine.

The said means advantageously comprise a control element the actuation of which causes the chassis of the machine to rotate about an axis parallel or coincident with the longitudinal axis of the said chassis, and an intermediate element articulated in relation to the chassis about an axis parallel to the longitudinal axis of the chassis. The beam of the machine, which extends in a manner known per se between its chassis and a hitch device, is articulated according to the invention in relation to the intermediate element about a substantially vertical axis while being connected to the chassis of the machine by a connecting rod which is eccentric in relation to the longitudinal axis of the beam.

According to another very interesting characteristic of the present invention the said means automatically and simultaneously cause the rotation of the chassis of the machine about a substantially vertical axis and the reversal of the direction of rotation of one of the rotary rake heads of the machine when the inclination of the axes of rotation of the rotary rake heads is modified. Thus when the chassis of the machine forms an angle different from 90° with the direction of travel of the machine, the rotary rake heads of the machine rotate in the same direction, while if the said chassis is substantially perpendicular to the said direction of travel the same rotary rake heads rotate in opposite directions, converging forwardly of the machine—seen in its direction of travel.

With this aim, and in addition to the said means, the machine according to the invention comprises a lever for reversing the direction of rotation of one of the rotary rake heads, which lever is mounted on one of the gear boxes of the machine and cooperates with a stop. This lever and this stop are respectively connected to two distinct members, these members moving in relation to one another during the transposition of the machine from one of its working positions into the other working position.

This last characteristic further shortens the time necessary for the transportation of the machine from its tedding position into its windrowing position and vice versa. Moreover in view of the automation of these operations it is impossible to commit errors of adjustment so that all risks of deterioration of the machine are likewise eliminated. According to the invention it is for example impossible for the arms of the rotary rake heads to collide as a result of omission of the reversal of the direction of rotation of one of the rotary rake heads when one passes for example from the lateral windrowing position into the tedding position.

The invention will be described in greater detail hereinafter, with further characteristics and advantages in the following description of a non-limitative example of embodiment of the invention given with reference to the accompanying drawings, wherein:

FIG. 6 represents a perspective rear view of the device according to FIG. 5.

Figure 1:
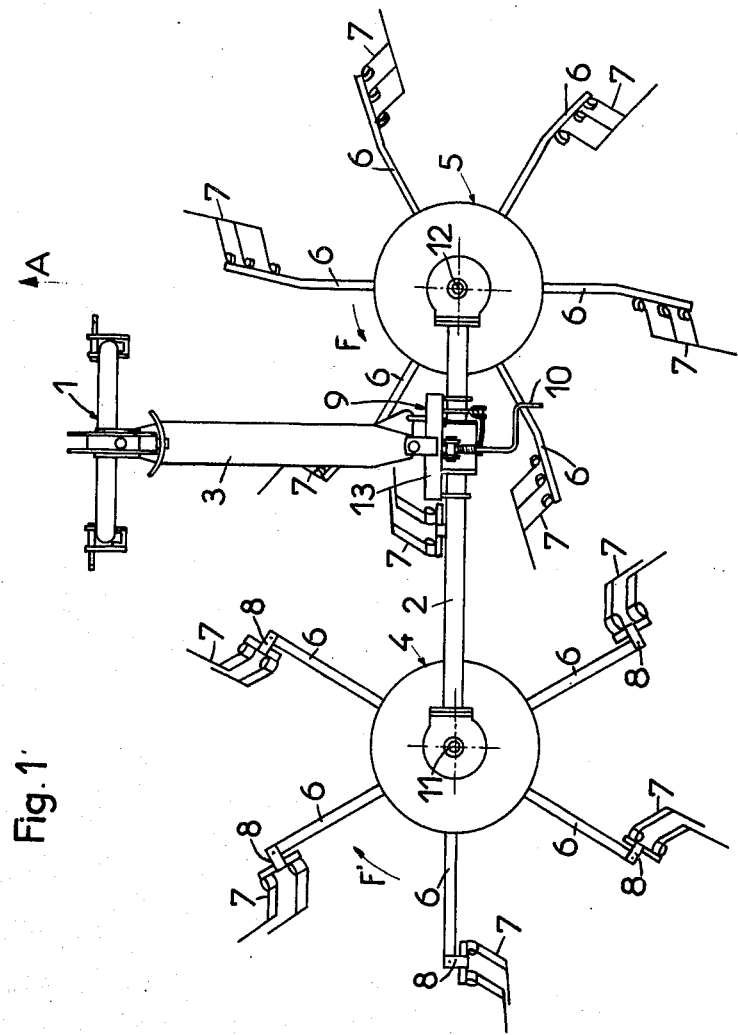
FIG. 1 represents a plan view of the machine in the central tedding position.

In the drawings, as shown in FIG. 1 the machine according to the invention is situated in its tedding position in which it is drawn in the direction of the arrow A by a teactor (not shown). The machine is hitched to this tractor by means of its hitch device 4 connected to the chassis 2 by means of a beam 3. In the tedding position the chassis 2 is substantially perpendicular to the beam 3 and the rotary rake heads 4 and 5 rotate in opposite directions to one another, converging to the front of the machine in the direction of the arrows F and F'.

Figure 2:
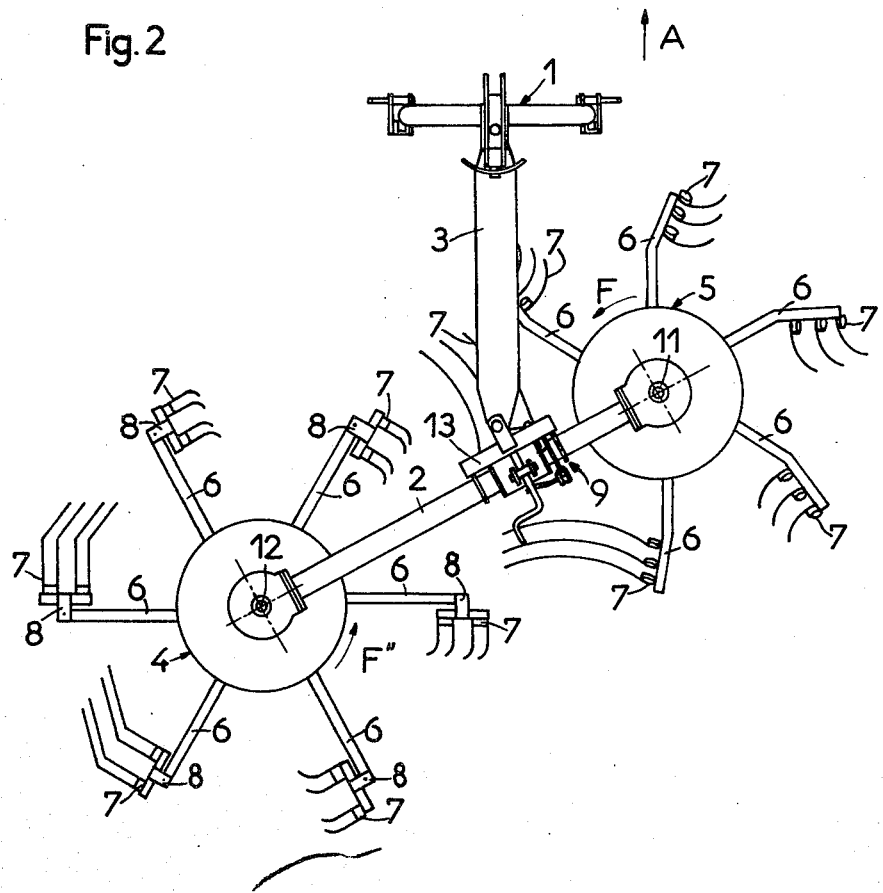
FIG. 2 represents a plan view of the machine in the lateral windrowing position.

Each of the rotary rake heads 4 and 5 comprises six arms 6 which, in the tedding position, extend substantially radially outwards from the center of each of the rotary rake heads 4 and 5. On the extremities of the arms 6 more remote from the center of the rotary rake heads 4 and 5 there are fixed tools 7 in the form of tines. The tools 7 of the rotary rake head 4 are mounted on a reversible support 8 so that they are always thrust in the same direction when the direction of rotation F" (FIG. 2) of the rotary rake head 4 is reversed in relation to the direction of rotation F' (FIG. 1). The machine as represented in FIGS. 1 and 2 likewise comprises a device 9 permitting the user to transfer the machine as represented in FIG. 1 into the position as represented in FIG. 2 and vice versa, simply by operating the crank handle 10.

By virtue of the device 9 this operation has the consequence of modifying the orientation of the chassis 2 in relation to the beam 3, while at the same time and automatically raising the axes of rotation 11 and 12 of the rotary heads 4 and 5, which for tedding are inclined forward in the direction A of travel of the machine. The aforementioned operation likewise permits, again by virtue of the device 9, of simultaneously and automatically reversing the direction of rotation F' of the rotary rake head 4. So that the machine as represented in FIG. 2 is always ready to carry out lateral windrowing work, it remains only to modify the position of the arms 6, modify the position and controlling of the tools 7 of the rotary rake head 4 and correctly to orient the land wheels (not shown) situated beneath the rotary rake heads 4 and 5 of the machine.

Figure 3:
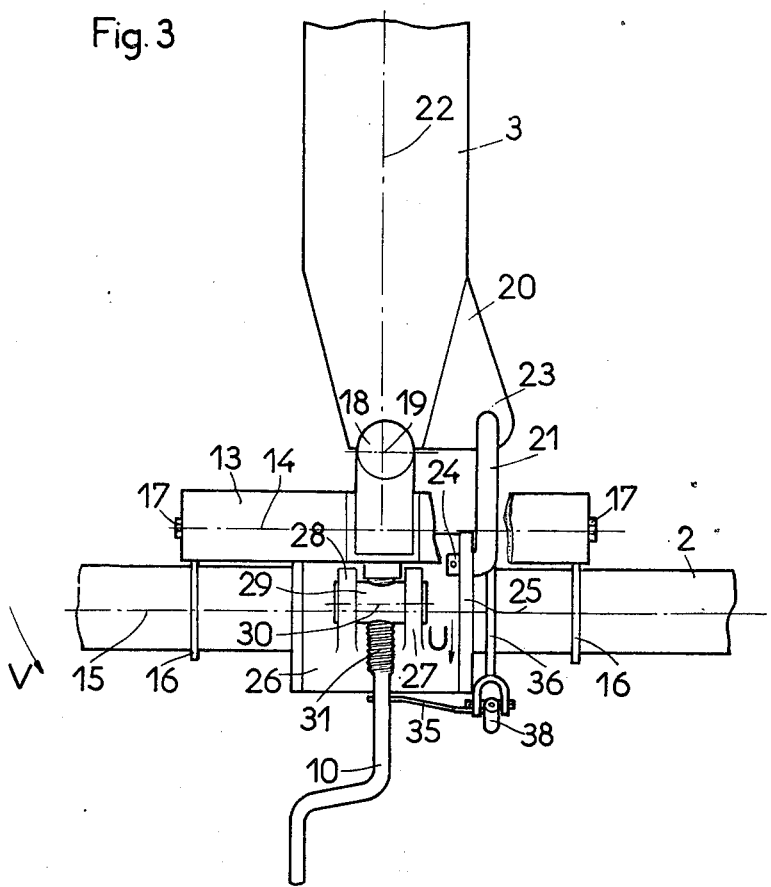
FIG. 3 represents a plan view on a large scale of the device permitting of passing the machine from its tedding position into its windrowing position and vice versa, the said device here being represented in the condition when the machine is in the tedding position.
Figure 4:
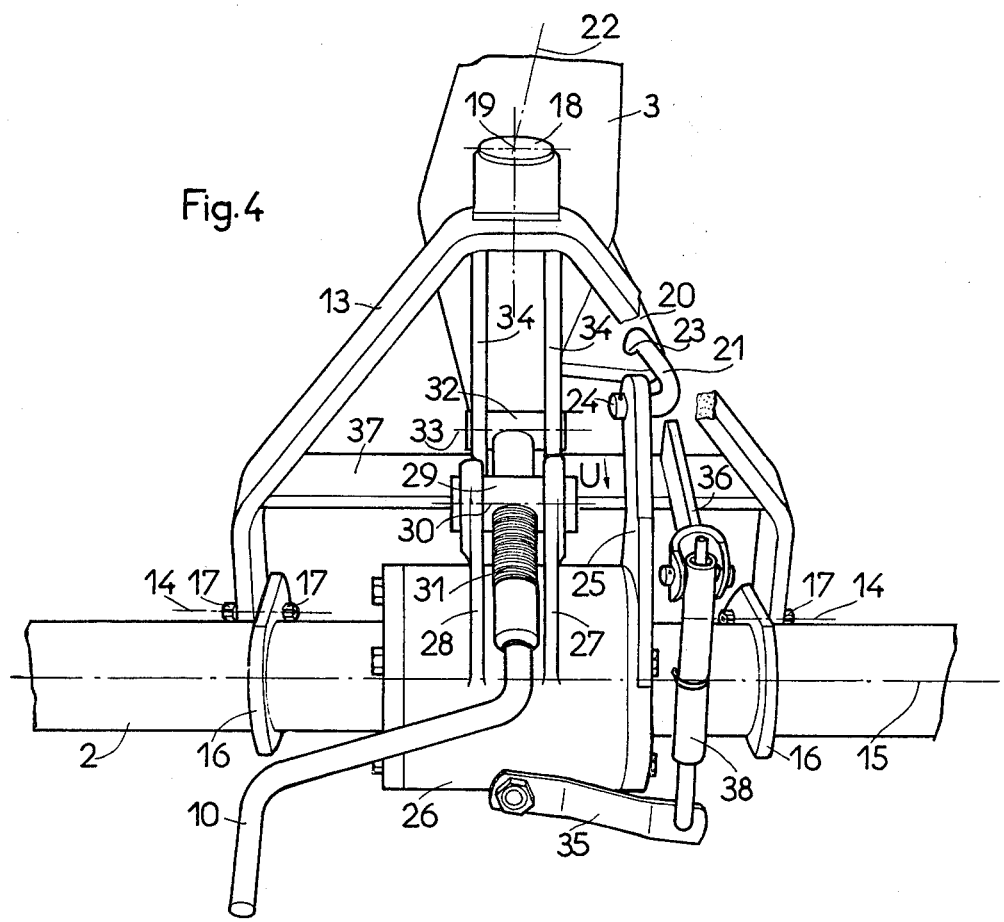
FIG. 4 represents a perspective rear view of the device according to FIG. 3.

The construction and operation of the device 9 will be described hereinafter in detail with reference to FIGS. 3 and 4, which represent it when the machine is in the tedding position, and with reference to FIGS. 5 and 6, which represent this same device 9 when the machine is in the lateral windrowing position.

In these figures it may be seen that an intermediate element 13 of triangular general form is disposed in a substantially vertical plane between the chassis 2 and the beam 3 of the machine. This intermediate element 13 is articulated at its lower part about an axis 14 parallel with the longitudinal axis 15 of the chassis 2. For this purpose the chassis 2 comprises lugs 16 extending towards the front of the machine and serving to ensure an articulated connection between the chassis 2 and the said intermediate element 13, by means of connection members 17.

The beam 3 is articulated to the intermediate element 13 about a substantially vertical shaft 18 fast with the said element 13. It will be noted that the geometric axis 19 of the shaft 18 and the axis 14 about which the intermediate element 13 is articulated can be convergent.

The intermediate element 13 under these circumstances may be in the form of a crosspiece.

Upon the beam 3 there is welded a lug 20 which is horizontal and comprises a hole. A connecting rod 21, which is eccentric in relation to the longitudinal axis 22 of the beam 3, is articulated to this lug by one of its extremities 23 about a vertical axis parallel with the geometric axis 19 of the shaft 18. The other extremity 24 of the connecting rod 21 is articulated about a horizontal axis parallel to the longitudinal axis 15 of the chassis 2, in the hole of a lug 25 directed upwards and fast with the central gear box 26 of the chassis 2.

The central gear box 26, where the transmission shaft terminates which serves to drive the rotary rake heads 4 and 5 of the machine in rotation, comprises two parallel lugs 27 and 28 on its upper part. A swivel pin 29 is articulated in rotation in these lugs 27 and 28 about an axis 30 parallel with the longitudinal axis 15 of the chassis 2 of the machine. This swivel pin 29 comprises, between the two lugs 27 and 28, a threading into which a threaded rod 31 can be screwed, on the extremity of which rod a crank handle 10 is provided. The other extremity of the threaded rod 31 is made fast in translation but movable in rotation in a second swivel pin 32 articulated rotatably about an axis 33 parallel with the longitudinal axis 15 of the chassis 2, this swivel pin 32 being articulated in two vertical struts 34 of the intermediate element 13. The threaded rod 31, constituting the control element of the device 9 thus extends between the chassis 2 of the machine and its intermediate element 13, the axis of this rod 31 intersecting the vertical rotation axis 19 about which the beam 3 of the machine is articulated.

The threaded rod 31, which can likewise be replaced by a double-acting hydraulic piston-cylinder unit, can likewise extend between the beam 3 and the chassis 2 of the machine or between the intermediate element 13 and the beam 3, this threaded rod 31 cooperating of course with swivel pins carrying out the same functions as the swivel pins 29 and 32 described above.

The above described device 9 likewise comprises supplementary means which, when the machine is transposed from one of its working positions into the other and vice versa, automatically and simultaneously cause the reversal of the direction of rotation of the rotary rake head 4 as well as the modification of the inclination and orientation of the chassis 2. These supplementary means are constituted by a reversing lever 35 acting upon the transmission elements (not shown) lodged in the gear box 26. This lever 35 cooperates with a stop 36 fast with a strut 37 of the intermediate element 13. It is likewise possible to connect the stop 36 to the beam 3 of the machine or to any other element of the machine, provided that the members to which the lever 35 and the stop 36 are respectively connected are subjected to a movement in relation to one another during the transposition of the machine from one of its working positions into the other position and vice versa.

In the example of embodiment as illustrated by the accompanying figures, the lever 35 is connected to the stop 36 by means of a device 38 which is described in detail in a patent application filed the same day by the present applicants. This device permits of registering the displacement of the stop 36 in relation to the lever 35 and transmitting the movement of the said stop 36 to it simultaneously or not with the displacement of this stop 36. Thus if the lever 35 is blocked by reason of the fact that the transmission members which it controls have for example two teeth situated one opposite to the other, the stop 36, nevertheless, can continue its displacement in relation to the said lever 35, this movement being registered by the device 38 which will restore it and transmit it to the lever 35 as soon as the teeth of the transmission members mentioned above are no longer placed one opposite to the other.

The operation of the device 9 will now be described. For clarification it will be assumed that the machine is situated in the tedding position (FIG. 1) and that it is intended to pass it into its lateral discharge windrowing position (FIG. 2). It is recalled especially that in the tedding position the rotary rake heads 4 and 5 rotate in opposite directions to one another, that the chassis 2 is substantially perpendicular to the beam 3 and that the rotation axes 11 and 12 of the rotary rake heads 4 and 5 are inclined forward, seen in the direction of travel of the machine. The operation of the device 9 is as follows. When the crank handle 10 in FIGS. 3 and 4 is rotated, the distance between the swivel pins 29 and 32 will increase. The translationally immobilized swivel pin 32 being situated at a fixed distance from the axis 14, the chassis 2, driven by the displacement of the swivel pin 29 over the screw 31, will pivot about the said axis 14 so that the lug 25 will be displaced towards the rear of the machine in the direction of the arrow U (FIGS. 3 and 4). This has the consequence of raising the rotation axes 11 and 12 of the rotary rake heads 4 and 5 which then come into a position which is substantially perpendicular to the ground.

In its displacement in the direction of the arrow U, everything occurs as if the lug 25 were pulling upon the connecting rod 21 which, being a fixed length, will pull upon the lug 20. This traction will exert a moment upon the beam 3 which will pivot in the clockwise direction about its vertical shaft 18. Now the beam 3 is fixed in relation to the tractor drawing the machine. Thus it is the chassis 2 and its intermediate element 13 which will be displaced en bloc in the opposite direction, that is in the direction of the arrow V in order to come into the position represented in FIG. 2.

In the course of this displacement the connecting rod 21 sweeps a circular sector in a horizontal plane, this sector having as radius the length of the connecting rod 21 and as center the vertical axis about which the extremity 23 of the connecting rod 21 pivots in relation to the lug 20. This vertical axis is parallel with the axis 19 about which the rotation of the chassis 2 occurs in relation to the beam 3. The other extremity 24 of the connecting rod 21 is articulated to the lug 25 about a horizontal axis to permit the lug 25 to sweep a circular sector in a vertical plane, this sector having as radius the distance of the axis 14 from the extremity 24 of the connecting rod and as center a point situated on this axis 14. The result is that the connecting rod 21 is disposed at right angles to the longitudinal axis 15 of the chassis 2, whatever is the position of the chassis 2 in relation to the beam 3.

According to a modification (not shown) the connecting rod 21 can also remain parallel with the axis 22 of the beam 3 whatever is the position of the chassis 2. In this case the extremity 23 of the connecting rod 21 will be articulated about a horizontal axis while its other extremity 24 will be articulated about a vertical axis parallel with the axis 19 about which the beam 3 of the machine is articulated.

Figure 5:
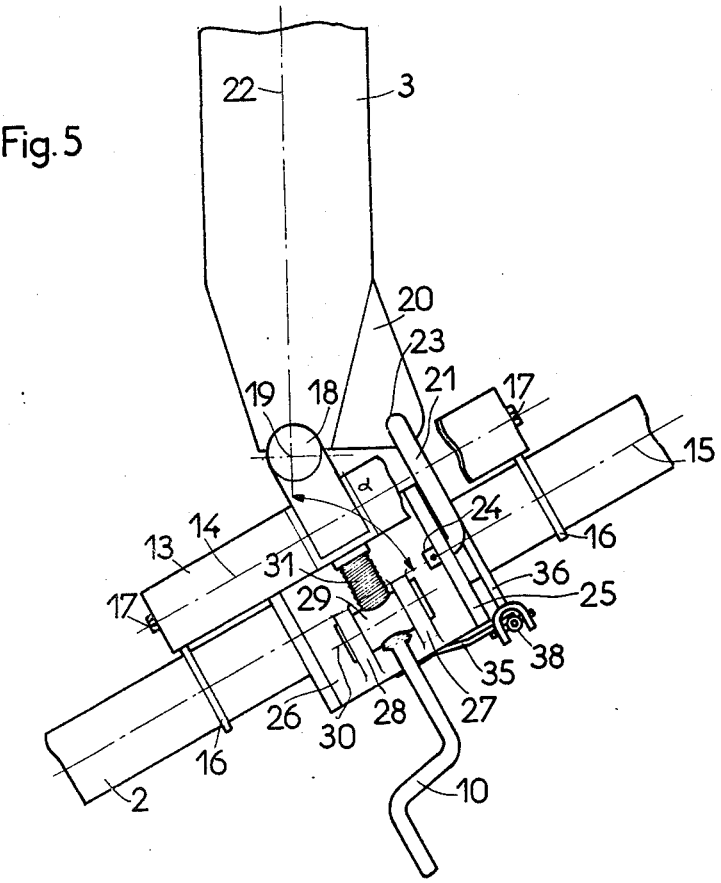
FIG. 5 represents a plan view similar to FIG. 3, where the device is represented when the machine is situated in the tedding position.

After a certain number of revolutions of the crank handle 10, the chassis 2 of the machine is on the one hand raised by pivoting about the horizontal axis 14 and on the other has pivoted in relation to the beam 3 about the axis 19 so that the device 9 is situated in the position illustrated in FIGS. 5 and 6, in which the axis 15 of the chassis 2 forms an angle α other than 90°, for example equal to 60°, with the axis 22 of the beam 3.

The control of the lever 35 for reversing the direction of rotation of the rotary rake head 4 is carried out in the following manner. When the machine is situated in the tedding position (FIGS. 1, 3 and 4), everything occurs as if the lever 35 were in the low position. As the crank handle 10 is rotated to cause the machine to pass into its lateral windrowing position, it has been seen that the chassis 2 pivoted about the axis 14 in the clockwise direction, if the machine is regarded laterally from the side of the rotary rake head 4. The lever 35 thus has the tendency to depart from the stop 36. Now the distance between this lever 35 and the stop 36 is fixed, but in view of the movement of the chassis 2 about the axis 14, everything occurs as if the lever 35 were placed in the high position (FIG. 6), whereas in fact it remains immobile since only the chassis 2 shifts.

Nevertheless the device 38 permits the lever 35 to move with the chassis 2 when it pivots about its axis 14, in the case for example of the teeth of a dog clutch housed in the box 26 and controlled by the lever 35 placing themselves not between but opposite to the teeth of the pinion effecting the drive of the rotary rake head 4. When the teeth of the clutch and the pinion can mesh the device 38 returns the lever 35 into the position which it occupied in relation to the stop 36 when the machine was in the tedding position.

The simple rotation of the crank 10 thus according to the present invention permits of simultaneously and automatically carrying out three operations, namely the orientation of the chassis 2 about a horizontal axis 14, corresponding to the adjustment of the angle of action of the rotary rake heads 4 and 5, the orientation of the chassis 2 about a vertical axis 19 and the reversal of the direction of rotation of one of the rotary rake heads 4.

So that the machine may be ready to carry out the operations of lateral windrowing, it remains only correctly to orient the land wheels of the machine and to modify the control and possibly the position of the tools 7 of the rotary rake heads 4 amd 5.

If it is desired to transpose the machine from its lateral windrowing position (FIGS. 5 and 6) into its tedding position (FIGS. 3 and 4) it suffices to reverse the direction of the operations stated above.

In FIGS. 1 and 2 it is seen that the device 9 is situated at the level of the central gear box 26. This device could equally well be situated at the level of one of the gear boxes of the rotary rake heads 4 or 5 or possibly at the level of the hitch device 1 of the machine.

Moreover it has been stated above that the threaded rod 31 could be replaced by a hydraulic cylinder-piston unit controlled from the tractor. This permits of further reduction of the time of passage from one working position of the machine into the other, likewise reducing the expenditure of muscular energy.

It is quite apparent that it will also be possible to effect other improvements, modifications or additions or to replace certain elements by equivalent elements, without thereby departing from the scope of the present invention.

What is claimed is:

1. A combined haymaking machine, permitting of carrying out lateral discharge windrowing work and central tedding work, said machine comprising:
   at least two rotary rake heads interconnected by a chassis,
   a control member the actuation of which causes the chassis of the machine to rotate about a first axis parallel with the longitudinal axis of the said chassis,
   an intermediate element articulated to the chassis about said first axis, and
   a beam extending between said chassis and a hitch device, said beam being articulated in relation to the intermediate element about a second substantially vertical axis while being connected to the said chassis by a connecting rod which is eccentric in relation to the longitudinal axis of the said beam and is articulated about a substantially vertical axis and about a substantially horizontal axis.

2. A combined haymaking machine according to claim 1, wherein said intermediate element constitutes a crosspiece the first and second axes of which are convergent.

3. A haymaking machine according to claim 1, wherein said connecting rod is disposed at right angles to the longitudinal axis of the chassis whatever is the position of said chassis in relation to the longitudinal axis of the beam of the machine.

4. A haymaking machine according to claim 1, wherein said connecting rod is disposed parallel with the longitudinal axis of the beam whatever is the position of said beam in relation to the chassis of the machine.

5. A combined haymaking machine permitting of carrying out lateral discharge windrowing work and central tedding work, of said machine comprising:
   at least two rotary rake heads interconnected by a chassis,
   a control member cooperating with a first swivel pin and connected in translation with a second swivel pin, said control member permitting of rotating the chassis of the machine about an axis parallel with the longitudinal axis of the chassis,
   an intermediate element to which one of said swivel pins is articulated while the other swivel pin is articulated to the chassis of the machine, said intermediate element being articulated to a first axis parallel with the longitudinal axis of the chassis,
   a beam extending between said chassis and a hitch device, said beam being articulated to the intermediate element about a second axis which is substantially vertical, said beam being connected to the chassis by means of a connecting rod which is eccentric in relation to the longitudinal axis of said beam, said connecting rod being articulated at each of its extremities on the one hand about a substantially vertical axis and on the other about a substantially horizontal axis, and
   a lever for reversing the direction of rotation of one of the rotary rake heads, said lever cooperating with a stop fast with the intermediate element, the lever and stop being disposed at the level of the gear box of the chassis of the machine, one of them being connected to the chassis of the machine while the other is connected to the intermediate element which moves in relation to the chassis in the transposition of the machine from one of its working positions into the other working position and vice versa, said stop being connected to the reversing lever by means of a device registering the displacement of said stop in relation to said lever and transmitting the displacement thereto.

* * * * *